United States Patent [19]
Hughes

[11] 3,839,639
[45] Oct. 1, 1974

[54] AUTOMATIC NIGHT SEARCH AND RESCUE SYSTEM

[75] Inventor: Richard Swart Hughes, China Lake, Calif.

[73] Assignee: The United States of America as represented by the Secretary of the Navy, Washington, D.C.

[22] Filed: May 21, 1973

[21] Appl. No.: 361,929

[52] U.S. Cl. ............................... 250/302, 250/461
[51] Int. Cl. .......................................... G01n 21/38
[58] Field of Search ........... 250/302, 365, 372, 461, 250/304

[56] References Cited
UNITED STATES PATENTS

| | | | |
|---|---|---|---|
| 3,200,254 | 8/1965 | Van Luik, Jr. et al. | 250/365 |
| 3,501,639 | 3/1970 | Monroe | 250/372 |
| 3,663,814 | 5/1972 | Madsen | 250/461 |
| 3,666,945 | 5/1972 | Frungel et al. | 250/365 |

*Primary Examiner*—Archie R. Borchelt
*Attorney, Agent, or Firm*—R. S. Sciascia; Roy Miller; R. W. Adams

[57] ABSTRACT

An automatic means for locating (search and rescue), and enabling surveillance of, articles, and the identification of reference points, particularly on water and at night, in which a laser is used to illuminate available florescent chemicals such as those used for current daylight search and rescue missions, and a detection system employing a florescence detector such as a low light level television camera and a threshold device for providing an alarm when the chemical is detected.

1 Claim, 2 Drawing Figures

AUTOMATIC NIGHT SEARCH AND RESCUE SYSTEM

CROSS REFERENCE TO RELATED APPLICATIONS

U.S. Pat. application Ser. No. 361,930, filed May 21, 1973, entitled "Fluorescent Marker" by the inventor of the present application.

BACKGROUND OF THE INVENTION

In the field of sea marking wherein a dye is used to aid in the search and rescue of survivors at sea, no known prior system can provide satisfactory results at night. Presently, most aircraft and ships include in their survival equipment dye material to be used as a sea marker in emergencies. The dye marker is brightly colored and covers an area much larger than the raft or other platform on which survivors may be drifting. As a result, the dye marker is much easier to locate in a search and rescue mission than would be a raft or other small vessel.

In all sea search missions wherein the objective is to rescue survivors by locating the sea dye marker, the mission's success depends on the visual observations of the searchers. Therefore, if the available light is reduced the dye marker will be less visible and harder to detect. As a result, such search and rescue missions are presently ineffectual at night.

SUMMARY OF THE INVENTION

The present invention is a search system that extends the available search period throughout the night, and utilizes presently used dye markers. The invention employs a laser for illuminating the dye marker. When illuminated by the appropriate laser the dye marker fluoresces, and gives off a light easily visible at night. And, when the light is detected by, such as, a low light level television camera an automatic alarm is given to the searches. As a result, the present invention is the only known effectual means or approach to automatically search at night when a dye marker is the only locator used by the survivors.

The present invention provides a means for locating articles on water and keeping them under surveillance, identifying reference points at sea, identification of friendly vessels, retrieval of training devices, and navigation. It is an automatic system that includes a detector for sensing light of a particular wavelength, either visible or invisible to the human eye, and providing an alarm alerting the operator when the light is detected. It is particularly useful as a search system at night.

DESCRIPTION OF THE PREFERRED EMBODIMENT

Figure 1:
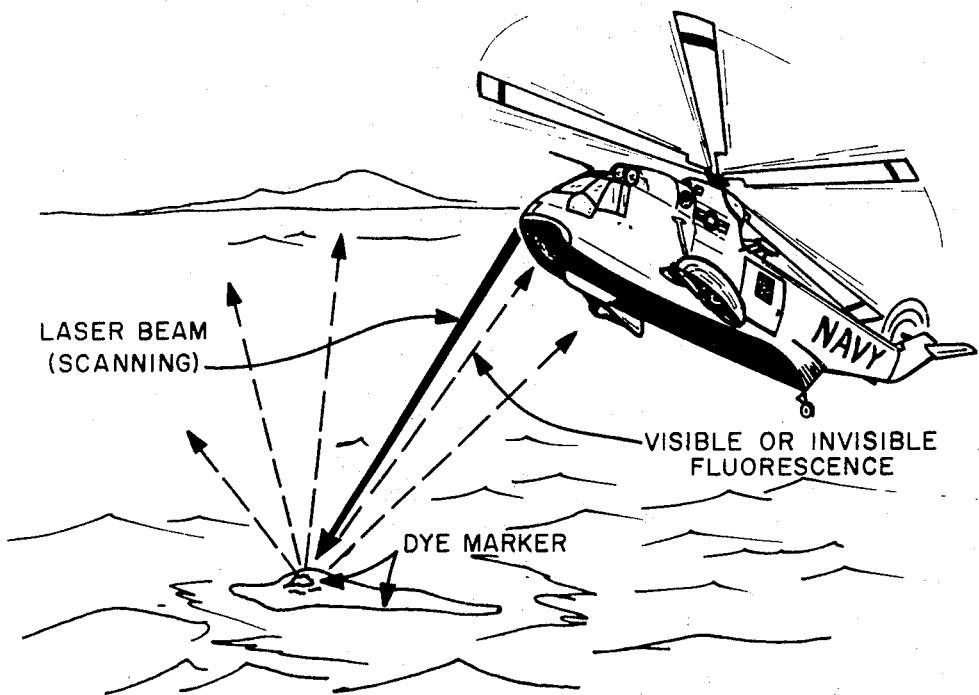
FIG. 1 is a diagrammatic view showing the operation of the preferred embodiment of the present invention.

FIG. 1 shows a diagrammatic view of the preferred embodiment of the present invention. A sea dye marker is placed in the sea, as a cloud near the surface or at a chosen altitude, or otherwise on or about the terrain. And, the dye is illuminated by a laser beam. The result is a fluorescence visible even at night to the human eye and/or presently available sensors. The novelty of the present invention resides in the use of the presently available and utilized dye marker in a manner heretofore uncontemplated, i.e., with an automatic detection system for detecting visible or invisible fluorescence. That is, the novelty resides in the use of a laser to illuminate presently available dyes, cause them to fluoresce, which fluorescence is visible or invisible and detectable even at night, and to detect them with an automatic detection system.

As shown in FIG. 1 the laser may be carried in an aircraft, such as a helicopter. The laser beam is operated in a scanning mode over the surface of the water in an area adjacent the aircraft. When the scanning operation illuminates the surface of the water colored by the dye, the dye fluoresces and radiates energy in all directions. The radiated energy, as previously mentioned, may be visible to the human eye or detectable by presently available sensors. Presently available lasers and dye markers provide a fluorescence that is easily visible or detectable, even at night.

It should be noted that the dye may be placed in the water, in a cloud, or in containers of various shapes and sizes. In each case the principles used for locating the marker are the same.

With respect to the dye: if a fluorescent dye is placed in an appropriate host; such as alcohol, water, or plastic, it will fluoresce when excited by light of an appropriate wavelength. The fluorescent dye can be hosted in a plastic, e.g., polymethylmethacrylate, stickes or sheets. And, if a stick or sheets is exposed by a rescuee to the intense light of the appropriate wavelength, it will light up or fluoresce. The exciting or pumping light must be of a shorter wavelength than the dye's fluorescent wavelength. The monochromatic light of a laser appropriately chosen for the dye used is the preferred illuminator of the present invention.

The sea dye marker presently used in all U.S. Navy life vests and rafts will also fluoresce brilliantly when illuminated by light of the appropriate wavelength. The fluorescent material contained in the packet or canister sea dye marker containers used by the U.S. Navy is fluorescein sodium salt (FSS). This organic compound has a very high fluorescence quantum efficiency and is, itself, at excellent organic dye laser material. The nitrogen ($N_2$) gas laser is an appropriate choice for illuminating the FSS compound. The 337 nanometer output of the $N_2$ gas laser is absorbed heavily by the FSS, and a concentrated solution of the dye will lase, or fluoresce, super-radiantly when pumped by the $N_2$ laser.

Figure 2:
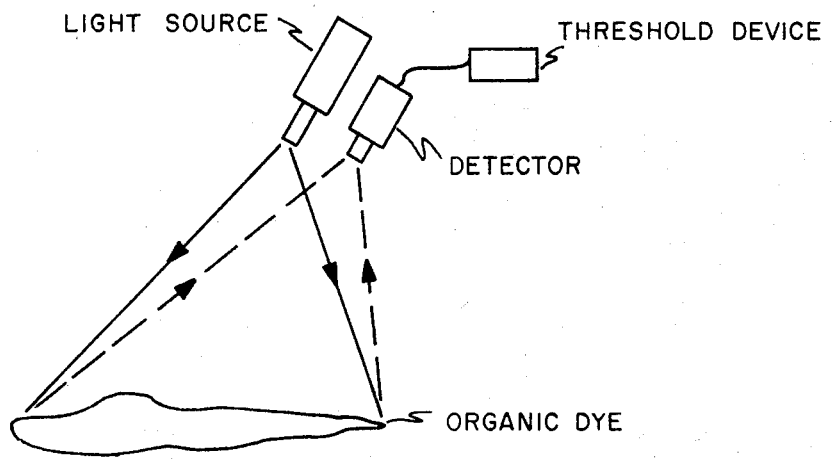
FIG. 2 is a diagrammatic view showing the basic components of the detection system of the preferred embodiment of the present invention.

FIG. 2 shows the basic components of the automatic detection system of the present invention. The components include a detector, such as a low light level television system, chosen for its sensitivity to the wavelength of the dye's fluorescence and a filter for optically filtering the light received at the detector to accept only the fluorescence band of the dye used. The filter will increase the signal-to-noise ratio of the receiver or detection system. Also included is a threshold device coupled to the detector for generating an alarm to alert the operator when the marker is detected. The alarm may be of any type, and if audible will free the operator for other duties until the marker is detected.

The present invention may be practiced by using any solid, liquid, or gaseous material that will lase or otherwise fluoresce when excited by laser light of the appropriate wavelength. The material, for example, may be any of a numerous variety of compounds. And, the laser may be chosen from any of those in the group having a wavelength shorter than the materials fluorescent wavelength. The detector should be chosen to have a field of view equal to that of the illumination source and be sensitive to the wavelength of the dye's fluorescence, and a filter should be used to filter out all wavelengths except those in the fluorescence band of the dye used. Any type of alarm may be used, but an audible alarm is preferred for many missions.

The present invention is useful to automatically detect fluorescence both visible and invisible to the human eye. If used as part of a system employing "invisible" fluorescence, the mission will be undetected by standard visual surveillance methods. And, in such a system a wavelength can be easily chosen that is not otherwise present in the environment in which the system is used.

It is intended that the invention not be restricted to the particular application disclosed and described herein. The invention is intended to include all automatic system applications wherein a fluorescable material is illuminated by a laser source to identify a reference point or friendly vessel, to locate and, if desired, track vessels or other articles on the water, to provide an improved means to be used in search and rescue missions, and to provide a low altitude hovering aid, particularly at night. The invention is an automatic system having a light detector for detecting light of the wavelength of the expected fluorescence and a threshold circuit used to provide a presentation of the detection to the operator.

What is claimed is:

1. An automatic search and rescue system for application during both daylight and dark periods, wherein personnel, such as a downed aircraft pilot, are located from the air for immediate or subsequent pick up and rescue, comprising:
   a sea dye marker visible to the human eye during daylight and cable of fluorescing when illuminated by an appropriate source, deployed by said personnel in the area of his position;
   a helicopter piloted by a human operator in a search pattern, wherein
      at least one person aboard said helicopter can visually scan the surface of the earth for detection of said marker;
   a gas laser supported by said helicopter and operated to perform a preselected scan pattern over said surface during said dark periods, providing a beam having a wavelength shorter than the fluorescent wavelength of the marker, such that said marker fluoresces and is detectable during said dark periods when illuminated by said beam; and
   electronic detecting means sensitive to the wavelength of said flourescence resulting from said illumination, including means responsive to detection of the fluorescence for automatically alerting said at least one person;
   wherein said at least one person can identify said marker during both daylight and dark periods such that search and rescue operations can be extended into and throughout the night without loss of effectiveness.

* * * * *